(12) United States Patent
Sundaram

(10) Patent No.: US 9,037,646 B2
(45) Date of Patent: May 19, 2015

(54) SYSTEM AND METHOD OF DELIVERING DATA THAT PROVIDES SERVICE DIFFERENTIATION AND MONETIZATION IN MOBILE DATA NETWORKS

(71) Applicant: Alef Mobitech Inc., Bernardsville, NJ (US)

(72) Inventor: Ganapathy Subramanian Sundaram, Hillsborough, NJ (US)

(73) Assignee: Alef Mobitech Inc., Bernardsville, NJ (US)

( * ) Notice: Subject to any disclaimer, the term of this patent is extended or adjusted under 35 U.S.C. 154(b) by 0 days.

(21) Appl. No.: 14/508,073

(22) Filed: Oct. 7, 2014

(65) Prior Publication Data
US 2015/0026250 A1   Jan. 22, 2015

Related U.S. Application Data

(60) Provisional application No. 61/888,280, filed on Oct. 8, 2013.

(51) Int. Cl.
*G06F 15/16* (2006.01)
*H04L 29/08* (2006.01)
*H04L 29/06* (2006.01)

(52) U.S. Cl.
CPC ........ *H04L 67/1021* (2013.01); *H04L 67/1095* (2013.01); *H04L 67/16* (2013.01);
(Continued)

(58) Field of Classification Search
CPC ............ H04L 67/1095; H04L 67/1089; H04L 67/1074; H04L 67/1021
USPC ................ 709/231, 245, 217, 223, 203, 238; 370/331, 235, 238, 351; 707/713
See application file for complete search history.

(56) References Cited

U.S. PATENT DOCUMENTS 7,149,797 B1 * 12/2006 Weller et al. .................. 709/223
2002/0004846 A1 * 1/2002 Garcia-Luna-Aceves et al. ............................. 709/245

(Continued)

FOREIGN PATENT DOCUMENTS

WO         01/76192 A2    10/2001
WO      2013/049603 A1     4/2013

OTHER PUBLICATIONS

International Search Report and the International Written Opinion dated Jan. 9, 2015 for corresponding International Application No. PCT/US14/59605.

(Continued)

*Primary Examiner* — Jungwon Chang
(74) *Attorney, Agent, or Firm* — DLA Piper LLP (US)

(57) ABSTRACT

An exemplary system according to the present disclosure comprises a lower tier Radiolet™ that is in communication with a local switching office of a mobile data network, and an upper tier Radiolet™ that is in communication with the lower tier Radiolet™ and an Internet datacenter. In operation, the upper tier Radiolet™ receives data extracted from the Internet datacenter and distributes at least a portion of the received data to the lower tier Radiolet™. At the lower tier Radiolet™, the portion of received data is stored. The lower tier Radiolet™ then receives a data request (relating to a portion of received data) and in turn, transmits data from the portion of received data to a source of the data request. The lower tier Radiolet™ is located closer to the source of the data request than the Internet datacenter to improve application performance and efficiency of network as well as datacenter.

30 Claims, 4 Drawing Sheets

(52) U.S. Cl.
CPC .......... *H04L 67/42* (2013.01); *H04L 67/2842* (2013.01); *H04L 67/2885* (2013.01); *H04L 67/288* (2013.01); *H04L 67/289* (2013.01)

(56) References Cited

U.S. PATENT DOCUMENTS

| | | | |
|---|---|---|---|
| 2002/0114278 A1* | 8/2002 | Coussement | 370/235 |
| 2004/0205219 A1* | 10/2004 | Li et al. | 709/231 |
| 2010/0034200 A1 | 2/2010 | Melampy et al. | |
| 2011/0137888 A1* | 6/2011 | Yoo et al. | 707/713 |
| 2012/0044908 A1* | 2/2012 | Spinelli et al. | 370/331 |
| 2012/0089700 A1* | 4/2012 | Safruti et al. | 709/217 |

OTHER PUBLICATIONS

Stella Spagna et al: "Design Principles of an Operator-Owned Highly Distributed Content Delivery Network," IEEE Communications Magazine, IEEE Service Center, Piscataway, US, vol. 51, No. 4, Apr. 1, 2013, pp. 132-140.

European Search Report dated Feb. 17, 2015 for corresponding European Application No. 14188155.7.

* cited by examiner

| FUNCTION | LOCATION |
|---|---|
| PHYSICAL LAYER CONTROL FUNCTIONS | CELL SITE |
| PHYSICAL LAYER TRAFFIC FUNCTIONS | CELL SITE |
| LINK LAYER CONTROL FUNCTIONS | CELL SITE OR LOCAL SWITCHING OFFICE (DEPENDING ON 2G VS 3G VS ENHANCED 3G VS 4G) |
| LINK LAYER TRAFFIC FUNCTIONS | LOCAL SWITCHING OFFICE |
| VISITED IP CONTROL FUNCTIONS | TYPICALLY AT THE REGIONAL SWITCHING OFFICE |
| VISITED IP TRAFFIC FUNCTIONS | LOCAL SWITCHING OFFICE |
| HOME IP CONTROL FUNCTIONS | CENTRAL SWITCHING OFFICE |
| HOME IP TRAFFIC FUNCTIONS | LOCAL SWITCHING OFFICE |
| LAYER 1 MOBILITY MANAGEMENT | CELL SITE + LOCAL SWITCHING OFFICE |
| LAYER 2 MOBILITY MANAGEMENT | LOCAL SWITCHING OFFICE + REGIONAL SWITCHING OFFICE |
| LAYER 3 MOBILITY MANAGEMENT | REGIONAL SWITCHING OFFICE + CENTRAL SWITCHING OFFICE |
| SESSION MANAGEMENT | HOME SWITCHING OFFICE |
| SUBSCRIBER MANAGEMENT | REGIONAL SWITCHING OFFICE + CENTRAL SWITCHING OFFICE |
| POLICY MANAGEMENT | CENTRAL SWITCHING OFFICE |
| POLICY ENFORCEMENT | DISTRIBUTED ACROSS NETWORK |
| PEERING | PEERING POINT OUTSIDE THE OPERATOR NETWORK |
| CONTENT INSERTION | LOCAL SWITCHING OFFICE |
| CONTENT MANAGEMENT | CONTENT DATACENTERS |
| APPLICATION HOSTING | LOCAL SWITCHING OFFICE |
| APPLICATION MANAGEMENT | CLOUD DATACENTERS |
| APPLICATION DELIVERY FRAMEWORK | CLOUD DATACENTERS PLUS LOCAL SWITCHING OFFICE |
| APPLICATION DATA DELIVERY | LOCAL SWITCHING OFFICE |
| APPLICATION DATA MANAGEMENT | CLOUD DATACENTERS |
| TRANSCODING OF MEDIA | CLOUD DATACENTERS |
| ADVERTISING ECOSYSTEM | CLOUD DATACENTERS PLUS LOCAL SWITCHING OFFICE |
| APPLICATION SUBSCRIPTION ECOSYSTEM | CLOUD DATACENTERS |
| VIRTUALIZATION AND SEPARATION ACROSS APPLICATIONS AND PROVIDERS | CLOUD DATACENTERS PLUS LOCAL SWITCHING OFFICE |
| ARCHIVING | CLOUD DATACENTERS |
| USER AUTHENTICATION AT APPLICATION LAYER | CLOUD DATACENTERS |

FIG. 4

SYSTEM AND METHOD OF DELIVERING DATA THAT PROVIDES SERVICE DIFFERENTIATION AND MONETIZATION IN MOBILE DATA NETWORKS

TECHNICAL FIELD

The present disclosure relates generally to wireless communications, and more particularly to content distribution and application delivery over mobile wide area networks. The present disclosure also relates to systems and methods for providing service differentiation and assurance over a wireless network for mobile Internet sites and mobile applications providers.

BACKGROUND

Methods to mobilize the Internet and deliver content are undergoing transformative changes. On the data networking side, mobile data network operators are able to provide mobile broadband services. On the application delivery side, cloud computing promises to simplify application roll outs and catalyze adoption across multiple verticals. However, inefficiencies in mobile content distribution and application delivery is impacting the entire value chain. Fundamentally, the value chain consists of a series of independent islands of technology and business owners, whose intentions and beliefs are often misaligned, leading to a number of inefficiencies due to the application and network not working in tandem. These inefficiencies include high mobile latencies, and inefficient use of network resources as well as application datacenter resources. Inefficiencies can be caused by data paths, where data requests from a network subscriber's device are received at a cell site, then sent to a local switching office, and then to a regional switching office en-route to a network peering point before being routed to an Internet datacenter that serves the application to the subscriber. The pathway within the wireless network is rooted on the need to provide multiple layers of mobility management and the need to centralize subscriber and session management. The pathway above the wireless network is due to network peering relationships, geographic distribution of such network peering points, and diversity of application datacenter locations above the network and centralized resource pooling of computing by application providers. Within the wireless network, the regional and central switching offices may not be local to the area where the subscriber is and hence, data served traverses several hundreds of miles before reaching the subscriber, creating a number of areas of inefficiency. More generally, applications are largely unaware of the network and tend to treat the network as a blackbox; conversely, networks are unaware of application needs and tend to treat applications as a sequence of packets. One problem of applications being unaware of the network, and network contours, is a network topology issue that contemporary over the top solutions cannot address. Given the economics of mobile data, operators do not find a compelling need to upgrade networks without content eco-system participation. Conversely, application awareness is not currently possible or available because it involves well more than just propagating a few parameters into the network. Network nodes typically deal with packets and methods to forward such packets, however, such network nodes are not suitable for dealing with applications. This mismatch between packet based network forwarding and the technology to service applications contributes to the current lack of application awareness within the network. In general, there is a lack of "end-to-end" intelligence between the two end points of an application, leading to significant over provisioning of resources within the mobile operator network and the various application datacenters. Existing mobile data networks are not built for a specific application, while there are thousands of applications, and conversely applications are not built for specific network types with network state information of a given network changing every instant.

Current partial solutions to the foregoing require an upgrade to the existing mobile data network and require mobile operators to re-architect their networks, which leads to significant increases in costs. However, even such upgrades and modifications are incapable of creating application awareness in the network or provide network awareness to the application.

In connection with the foregoing, it is desirable to have systems and methods that can reduce the number of hops between the end points of the application, by bringing mobile content and application servers and Internet cloud content closer to the subscriber, as well as creating optimized paths between the end points especially when the end points are both clients and are local to the area. It is also desirable to create optimal paths for traffic data from a local switching office, while preserving all layers of mobility and tiered deployments, and allowing applications and networks to work with each other without any modifications to the network or application datacenters. Additionally, it is desirable to create a framework along this optimized path wherein the network and application can work in tandem.

SUMMARY

The present disclosure relates to systems and methods of delivering data comprising at least one upper tier Radiolet™ receiving data extracted from an Internet datacenter and distributing at least a portion of the received data to at least one lower tier Radiolet™. The at least one lower tier Radiolet™ stores the portion of the received data and, in response to a data request, transmits data from the portion of received data to a source of the data request. Notably, the at least one lower tier Radiolet™ and the at least one upper tier Radiolet™ are located closer to the source of the data request than the Internet datacenter, thereby reducing the number of processing points between the end points of the application session. Furthermore, the at least one lower tier Radiolet™ and the at least one upper tier Radiolet™ may be both network and application aware, thereby allowing network information and application information to be dynamically applied at the same location to further reduce inefficiencies between the end points of the application session.

BRIEF DESCRIPTION OF DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings:

FIG. 4 illustrates an exemplary distribution of end to end functionality according to an exemplary embodiment of the present disclosure.

DETAILED DESCRIPTION

Figure 1:
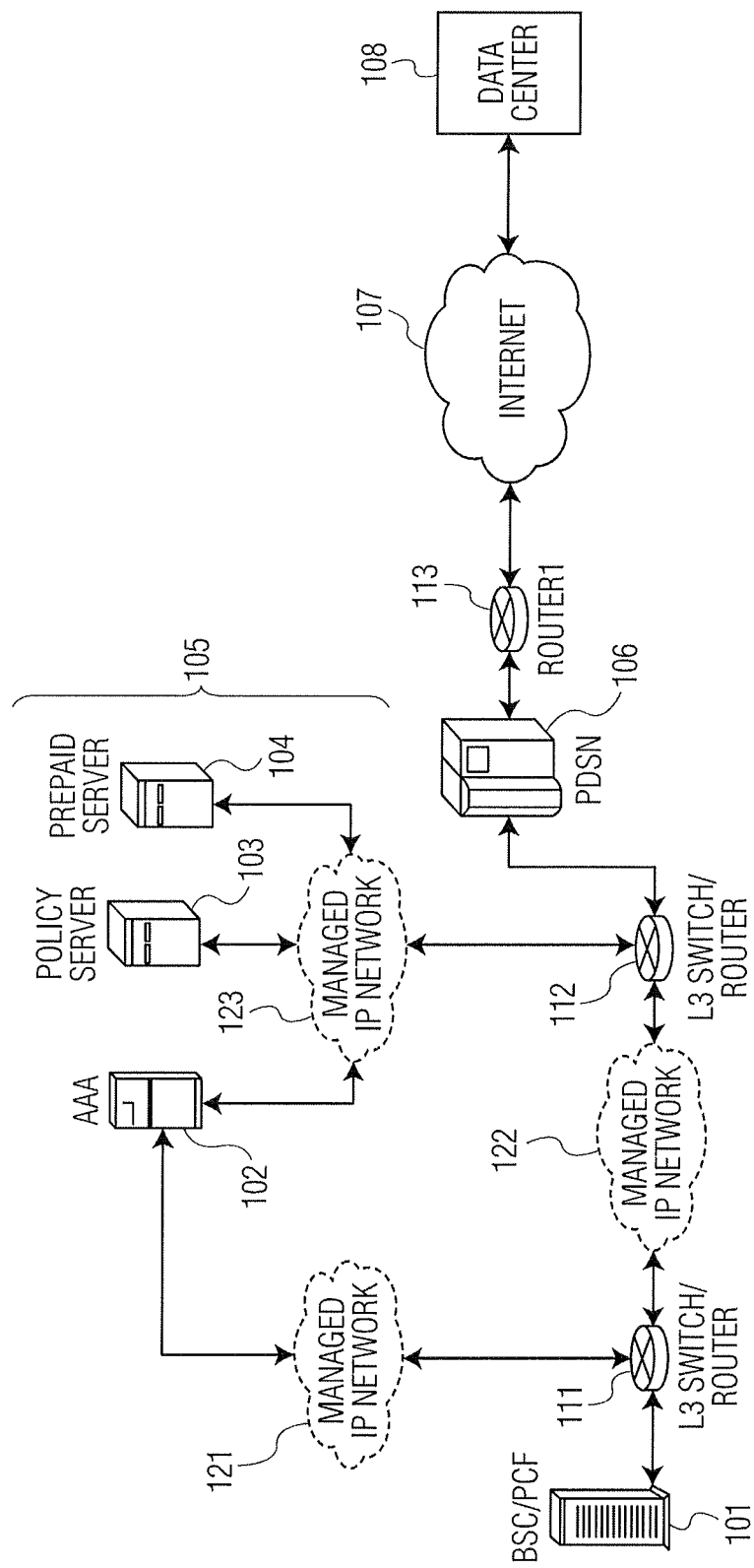
FIG. 1 illustrates an exemplary mobile communications network.

The following definitions and descriptions are provided and may be useful to better understand the concepts described in this disclosure:

"Radiolet™" refers to any type of server or servers, including those configured for use in connection with mobile data networks such as, for example, any application servers, communications servers, proxy servers or any other suitably configured servers. The server or servers may comprise any type of computer software and computer hardware, and include one or more processors for executing computer-readable instructions. In an exemplary embodiment, a Radiolet™ may refer to a temporary and partial instance of a cloud (e.g., the Internet), embodied and provide via one or more servers located at a radio edge (e.g., outer limits of radio processing functions within a mobile data network), that is configured to be application aware and to provide one or more application services.

"computer" or "computer hardware" refers to any electronic device or devices, including those capable of being utilized in connection with a mobile data system, such as, for example, any device capable of receiving, transmitting, processing and/or using data and information. A computer or computer hardware may comprise one or more of the following: a server, a processor, a microprocessor, a personal computer such as, for example, a laptop computer, a tablet, a palm PC, a desktop or a workstation computer, a network server, a mainframe, an electronic wired or wireless device such as, for example, a telephone, a cellular telephone, a personal digital assistant or a smart phone, an interactive television such as, for example, a television adapted to be connected to the Internet or an electronic device adapted for use with a television, an electronic pager or any other computing and/or communication device, whether located in a single or across multiple locations.

"network" refers to any type of network or networks, including those capable of being utilized in connection with a mobile data system such as, for example, any public and/or private networks, including, for instance, the Internet, an intranet, an extranet, or any wired or wireless network(s) or combinations thereof.

"data" refers to any type of facts, figures, statistics, details, images, multi-media content, quantities, characters, symbols or any other type of information and/or communication, including those capable of being utilized in connection with a mobile data network such as, for example, any Internet content data or Internet application data, that may be received, processed, stored and/or transmitted by a computer in the form of electrical signals and recorded on magnetic, optical, and/or mechanical recording media.

"datacenter" refers to one or more networked computer servers configured for receiving, processing, storing and distributing large amounts of data. For purposes of the present disclosure, datacenters may also be configured to operate within mobile data networks such as, for example, an Internet cloud-based datacenter.

"application" refers to a collection of one or more computer-readable instructions that when executed, carry out one or more specific operations. In the context of the present disclosure, an application may be embodied as software executing on one or more computers and configured to perform operations for use in connection with mobile data networks, although the present disclosure is not limited thereto. For purposes of the present disclosure, an application may be configured for use in conjunction with any operating system platform, such as, for example (and without limitation), Windows®, Android®, and Apple®.

In the context of wireless Internet communications, mobile application performance can be significantly inferior as compared to wired Internet communications. For instance, the latencies may be extremely high compared to wired Internet communications. The higher mobile latencies can be due, at least in part, to the "Mobile Middle Mile™" problem. Moreover, the Mobile Middle Mile™, combined with the lack of end-to-end intelligence, also leads to a number of inefficiencies in resource utilization in the network as well as datacenter. This problem can occur when a subscriber accesses a mobile site or application through a mobile data network. Data requests from the subscriber's device can be received at a cell site, and then sent to a local switching office, following which data packets are tunneled to a regional switching office, followed by tunneling to a central switching officer, before being routed to an Internet datacenter via a network peering point. The data packets traverse multiple switching offices before being routed to the Internet in order to provide multiple layers of mobility management and centralization of subscriber and Internet session management. Often times, the data requests will pertain to data that is typically locally available at a datacenter close to the local switching office or pertain to applications between two end points that are in geographic proximity to each other. However, the regional and central switching offices, as well as peering points and application datacenters, may not be local to the area where the subscriber is and hence data packets may have to traverse several hundreds of miles before reaching the subscriber. This data traversal across multiple switching locations can create high latency. The data path from the local switching office to the Internet data center that serves the subscriber may be referred to as the "Mobile Middle Mile™" problem.

As will be evident from the following description, the present disclosure provides means for addressing the Mobile Middle Mile™ problem by reducing round trip time (RTT) for traffic data packets coupled with improved application performance through propagation of network and application intelligence in the path while simultaneously improving the efficiency of mobile broadband connections by bringing Internet cloud or content closer to subscribers. The present disclosure can also achieve improvement in radio efficiency by improving the number of pages, videos, and applications transmitted per Megahertz of spectrum, improvement in transport efficiency by reducing the number of traffic packets that traverse the transport network, improvement in core network efficiency by reducing the number of traffic packets that traverse the core network, and improvement in datacenter efficiency by reducing the number of content and/or application traffic sessions that are hosted in the datacenter.

The present disclosure also provides means for the retention of centralized control within a mobile data network of functions related to (without limitation): subscriber management, session management, mobility management, policy management, peering, and other specialized functions such as intercept, the retention of centralized control within a cloud datacenter related to: application layer authentication, application databases, content ingestion and storage, application peering, and other specialized functions such as usage metrics and reporting, and the decentralization of content distribution, application data, application hosting, and delivery of such packets from a location in the network much closer to the subscriber. Referring briefly to FIG. 4, an exemplary (nonlimiting) listing of such functions, together with various locations/apparatus across which such functions may be distributed and performed, is shown.

The present disclosure also provides means for mobility at the application or content layer, when content and application data are served from or hosted at a location in the network much closer to the subscriber, by which the application service point is migrated to yet another closer point in the network as the mobile subscriber migrates from cell tower to another or when network control migrates from one switching office to another midway through an application session.

The present disclosure also provides means for simultaneously improving the efficiency of every segment of an existing mobile data network without having to upgrade said existing network or cloud/application datacenters within said network. In addition, the present disclosure provides means for improving efficiency of mobile operator networks as well as Internet cloud datacenters by reducing the amount of traffic packets that traverse through an existing mobile data network, allowing data packets to traverse the existing mobile data network faster. Also, the present disclosure can combine an existing mobile data network with a network of software and Radiolets™ that have an independent management system and network operations center for the software and Radiolets™, thereby eliminating the need for an upgrade to the existing mobile data network. The present disclosure can be operator friendly and includes software and Radiolets™ combined with an existing mobile data network that allows the operator to retain subscriber and session management through a core network of the existing network, while traffic requests are served to the Radiolets™ from the local switching location.

In addition, the present disclosure provides means for identification of traffic flow data from signaling flow data, and serving content and application data from the local switching office. The signaling flow data are permitted to pass through an existing mobile data network that include servers and specialized hardware for handling network subscriber management, network session management, and network mobility management, without any changes. Similarly, application layer signaling flow data may be permitted to go to existing application data centers for handling application layer session set up and application provider management functions. The traffic flow data may be directed to pass through another mobile data network or more generally another Internet Protocol (IP) based data network. The present disclosure can also provide means for distribution, storage, and delivery of content, as well as hosting of applications from the local switching office, in the other mobile data network. As indicated above, FIG. 4 provides a summary of various (exemplary) functions and the locations/apparatus across which such functions may be distributed and performed. Notably, the signaling/management entities may be separated from traffic functions and the traffic functions may be moved closer to the user without requiring upgrades to existing network or datacenters.

The present disclosure can also provide for a software based adaptive overlay solution, which operates on standard servers, across a highly distributed network that does not require any upgrades to existing operator networks or to the datacenters, including Internet cloud based deployments, of content and mobile applications ("apps") providers. This software based adaptive overlay solution can provide means for separating the control planes of mobile routers or switches from the data planes of the routers or switches of a mobile data network as well as application servers or application switches of a datacenter. The control planes can comprise signaling data transactions and the data planes can comprise traffic data transactions. An Internet datacenter, for example, a cloud-based datacenter, may be brought to the data planes and the combined data plane/internet cloud may be brought close to a mobile subscriber. The combined data plane/internet cloud can distribute mobile networking and mobile computing data to a location close to the subscriber. The network control plane can be used for management functions and can be preserved in a centralized manner in the existing network elements of the mobile data network and the application control and management functions can be preserved in a centralized manner in the existing application servers of the application cloud datacenters. Moreover, such preservation can be accomplished in a transparent manner without any upgrades to existing mobile data network or application datacenter. For example, any of the exemplary functions listed in FIG. 4 may be distributed and performed across existing network elements, while at the same time preserving application control and management functions in existing application services and cloud datacenters.

Still further, the present disclosure provides means for intelligent cross layer resource management and flow control methods simultaneously applied to network packet flows and content delivery and application sessions, which can lead to dramatic improvements in operating efficiency of the spectrum.

Still further, the present disclosure can provide means for increasing data transaction volume across a mobile data network and reducing churn rate, where churn rate is the percentage of subscribers in a given time frame that cease to use the content or application provider's services, which can be beneficial to a mobile content or application provider. The present disclosure can provide means for increasing the amount of content and application transactions per megahertz (MHz) of cellular frequency at a reduced cost, which can be beneficial to a mobile operator. The present disclosure can also provide means for improving quality of experience (QoE) for mobile services by reducing mobile latency, which can be beneficial to a subscriber and an enterprise application user.

Still further, the present disclosure can provide means for increasing the richness of applications delivered from application datacenters and increasing application adoption with corresponding application churn rate as well as customer acquisition costs. The present disclosure can provide means for improving the number of application sessions supported across a given a datacenter footprint thereby reducing the cost of application delivery. The present disclosure can also provide means for higher definition quality of experience (hi-def QoE) for mobile applications which can be beneficial to subscribers and enterprise application users.

In an exemplary embodiment, the present disclosure can include the following two tier distributed architecture: a lower tier network of servers (e.g., lower tier Radiolet(s)™) that interface with an operator network and an upper tier network of servers (e.g., upper tier Radiolet(s)™) that interface with a content and application provider eco-system, including, for example, a publisher, advertising network, or enterprise datacenter, or over the top communications application provider datacenter. One or more of the Radiolet(s)™ may represent a temporary and partial instance of a cloud (e.g., a cloudlet such as the Internet), embodied and provide via one or more servers located at a radio edge (e.g., outer limits of a mobile data network), that provides application aware and application service(s), and that comprises software capsules such as, for example, application programming interfaces (APIs). This type of radiolet instance may be referred to as Radio Edge Cloudlet™. One or more lower tier Radiolet(s)™ can be connected to one or more upper tier Radiolet(s)™ using a high speed managed link, while upper tier Radiolet(s)™ may be logically connected to each other through the Internet. Adequate security and redundancy can be provisioned between the lower tier Radiolet(s)™ and the upper tier Radiolet(s)™ as required or desired.

The lower tier Radiolet(s)™ can comprise one or more servers and storage devices, and can be located at a local switching office of a mobile data network operator. The location of the lower tier Radiolet™ may depend on transportation costs, for example (and/or other factors). A plurality of cell sites can also be aggregated at the local switching office. In one embodiment, an optimal location for the lower tier Radiolet™ can be a location that is relatively close to subscribers, but yet does not require significant capital expenditure. The lower tier Radiolet(s)™ can be physically connected to a layer 2 or layer 3 switch, where the layer 2 switch provides connectivity from the local switching office to a regional switching office, and the layer 3 switch provides connectivity from the regional switching office to a central switching office, or a router that is part of the overall network in a local switching office of a mobile data network. In one exemplary embodiment of this disclosure, during operation, the lower tier Radiolet(s)™ may be configured to provide one or more of the following functions: passively monitor control signaling messages (for example, A11 messages in an High Rata Packet Data (HRPD) standards based mobile data network) and extract relevant parameters while processing of and responding to said controlling signaling messages (for example A11 messages in an HRPD standards based mobile data network) is handled by network elements in the packet core (for example a Packet Data Service Node (PDSN) in and HRPD standards based mobile data network); encapsulate and tunnel data traffic packets (for example, A10 packets in an HRPD standards based mobile data network) for bearer packets; potentially communicate with the upper tier Radiolet(s)™ to dynamically fetch the content data, which can be based on the business relationship with over-the-top (OTT) content and application partners, where the OTT partners can be any provider of mobile content or application data; be a serving point for the subscriber Internet protocol (IP) sessions, which means that a subscriber IP session is not extended up to the upper tier Radiolet(s)™; process dynamic content, support content caching and storage, which can be used for accelerated and efficient content delivery; communicate with the operator proxy Radiolet(s)™ to send and receive messages to policy and charging rules function (e.g., PCRF) servers, real time mediation device (RTMD) and authentication, authorization, and accounting (e.g., AAA) servers; work with the operator proxy Radiolet(s)™ to enable content layer mobility during network mobility events (for example, layer two handoffs or inter-packet control function (PCF) handoff in an HRPD standards based mobile network); network and application layer quality of service (QoS) enablement; and work with operator owned lawful intercept network elements.

In another exemplary embodiment of this disclosure, the said tunneling and delivery of data traffic packets (for example, A10 messages in an HRPD standards based mobile data network) is achieved without any extraction of parameters contained in control signaling messages (for example, A11 messages in an HRPD standards based mobile data network) but instead through a combination of an automated learning method that observes packet flows between the packet core and RAN as well interfaces with existing management nodes and billing as well as accounting systems in the operator network.

The upper tier Radiolet(s)™ can comprise one or more servers and storage devices located in a hosting datacenter(s) external to operator networks. The upper tier Radiolet(s)™ can serve multiple lower tier Radiolets™ across multiple operator networks in a given geographic area. The upper tier Radiolet(s)™ can be physically connected to a layer 2 or layer 3 switch or a router that is part of the overall network in a private or public cloud datacenter. The upper tier Radiolet(s)™ can comprise back to back (B2B) user agents and open application programming interfaces (API) that can interface with multiple application delivery datacenters and third party software products. In one embodiment, the upper tier Radiolet(s)™ may not be co-located or located in the packet core (for example, next to a packet data serving node (PDSN) of an HRPD standards based mobile network) or any point of present (PoP) of a mobile data network, but rather located close to the user outside the mobile data network with a view towards enabling functionality that is typically available at a private application data center or public Internet cloud datacenters. In one embodiment of the operation, the upper tier Radiolet(s)™ can provide one or more of the following functions (but not limited to): support a mobile web services engine coupled with dynamic on demand virtualization to support multiple sessions across multiple content properties; distribute content dynamically to the lower Radiolet(s)™; and serve multiple operator networks. Also, in an exemplary embodiment, any upper tier Radiolet(s)™ can communicate with multiple lower tier Radiolet(s)™ within a given geographic area, through a high speed managed network, which will allow for leveraging of statistical multiplexing gains, without any impact on content distribution, application delivery, and corresponding service assurance.

In an exemplary embodiment, a system according to the present disclosure can also include a lower tier network of proxy servers (herein referred to as "operator proxy Radiolet(s)™") and an upper tier network of proxy servers (herein referred to as "over the top proxy Radiolet(s)™"). The operator proxy Radiolet(s)™ can be configured to support interfaces to billing and policy enforcement in the operator network. The operator proxy Radiolet(s)™ can be configured to facilitate proxying of messages from a plurality of lower tier Radiolet(s)™ towards an accounting server (for example, a AAA server), and towards a billing server (for example, towards a diameter based billing system), and towards a policy server (a PCRF server, for example, in HRPD standards based systems). The operator proxy Radiolet(s)™ can facilitate content layer mobility during inter-PCF handoff. The operator proxy Radiolet(s)™ can be located relatively close to the packet core (for example close to a PDSN in and HRPD based mobile data network). The over the top proxy Radiolet(s)™ can be located in a large geographic area and can support interfaces to metering and application policies across multiple content and application datacenters, or customized to support specific large application provider in a private datacenter of the said application provider. The location of the both operator and over the top proxy Radiolets™ may depend on transportation costs, operations costs, and other costs for example (and/or other factors including business agreements and policies).

The present disclosure can provide means for supporting content and application layer mobility which exploits two tier network architecture and can include a distributed network management system that provides high availability managed services with or without any tight integration to operator network management systems or content eco-system datacenter network management systems. The present disclosure can also provide means for interfacing to content or application eco-system partner datacenters, as well as mobile data network operator partner networks that can be customized based on various requirements. The present disclosure can also provide means for supporting specialized services such as, for example, mobile streaming, peer to peer communications services, and real time TV services to mobile subscribers.

In another exemplary embodiment, data is fetched from various participating Internet sites and/or enterprises, and made available to one or more upper tier Radiolet™ locations. The data can include, but is not limited to, content, media feeds, and application data. One or more of the upper tier Radiolet(s)™ obtains the data, following which the data can be replicated across multiple other upper tier Radiolet(s)™ in multiple locations. The choice of other upper tier Radiolet(s)™ that obtain data from the upper tier Radiolet(s)™ may depend on various static and dynamic rules. Exemplary static rules may include content types and policies provided in advance by content partners, where content partners can be any providers of mobile content or data, and dynamic rules may be created periodically based on outputs of intelligent content management algorithms. The data may then be replicated in one or more lower tier Radiolet(s)™. The lower tier Radiolet(s)™ can fetch the data from the upper tier Radiolet(s)™ or the upper tier Radiolet(s)™ can distribute the data to the lower tier Radiolet(s)™. Parameters for deciding which pieces of data are stored in a given lower tier Radiolet™ may be based on the frequency of requests for the same piece of data (for example, the popularity of data), networking, datacenter, and business policies, or any other desired parameters.

When a subscriber mobile device requests for traffic data, this request may be delivered to the lower tier Radiolet(s)™ in the network that is closest to the subscriber. In one exemplary embodiment of this disclosure, the closest lower tier Radiolet(s)™ to the subscriber can be located at the local switching office where the traffic request from the subscriber is received. Directing the traffic request to the closest lower tier Radiolet(s)™ may include identifying and separating traffic packets from network signaling and application layer signaling packets (from the subscriber mobile device). In one embodiment, such identification and separation can be implemented in a switch that manages and communicates across all lower tier Radiolets™. Then, all network signaling data may be sent directly to the mobile packet core network, where the core network can comprise various servers providing various particular functions such as, for example (and without limitation), policy and charging rules function (e.g., PCRF) servers, real time mediation device (e.g., RTMD) and authentication, authorization, and accounting (e.g., AAA) servers, and packet data serving node (PDSN) servers, or other network elements known in the art. Similarly, application signaling packets may be sent to appropriate application provider data centers. Next, all data packets that are not signaling may be declared as traffic packets, and directed to the lower tier Radiolet(s)™. The lower tier Radiolet(s)™ may then create a temporary instance of the content/media/application session and service the request in a manner similar to an existing content/media/application server in a cloud datacenter. In one embodiment, the said content/media/application server may create a flow control protocol session such as, for example, a transmission control protocol (TCP) session, with the subscriber mobile device using existing Internet protocols, and deliver traffic data as a flow control protocol, or for example, a TCP, datagram. Following completion of the content/media/application session, additional sessions from the same or different subscriber mobile device(s) may then be processed using the same procedures. In an embodiment, a wireless link is shared across multiple users, and multiple cell towers or wireless access devices are aggregated at a given local switching office, and accordingly, a given lower tier Radiolet™ server can process and serve multiple user requests as well as re-use the same hardware and software to support multiple users across time.

The present disclosure can achieve efficiency improvements in the network through one or more of the following: fundamentally, fetching, storing, and delivering data from the closest lower tier Radiolet(s)™ reduces the latency of the content/media/application session and can allow more subscriber sessions to be hosted on the same network; completing a session in a shorter amount of time also allows for a given subscriber mobile device to stop sending physical layer control messages (e.g., pilot beams and channel quality information), which can allow the network to admit additional subscribers who may be able to make additional traffic data requests; and through a combination of resource management and flow control methods, additional and significant gains in operating efficiencies in the spectral efficiency can be achieved which can allow for faster flow control protocol sessions. Furthermore, following the completion of a data content or application session, the present disclosure can allow for additional sessions from the same or different subscriber mobile devices using the same methods.

In an embodiment, the present disclosure can additionally improve overall efficiency and dramatically improve user Quality of Experience (QoE) through software APIs that provide network awareness to the application thereby allowing applications to adapt to the network type and network state changes in real time as well as application awareness to the network to intelligently allocate and manage resources in the radio access network.

In one embodiment, the present disclosure can include the following features (without limitation), applicable to a content eco-system subscriber base: the lower tier Radiolet(s)™ may directly provide storage and caching for static content/pages; dynamic mobile content acceleration may be provided through a hybrid caching/storage and mobile web services solution; the functionality for dynamic site acceleration may be split between both the upper tier and lower tier Radiolet(s)™; application delivery frameworks may be hosted at a lower tier Radiolet™ or at an upper tier Radiolet™, while application data that is frequently used may readily be available in an upper tier Radiolet™, whereas seldom used data may be fetched from an application partner's origin datacenter, where the application partner can be any provider of mobile software application content or services; and both the lower tier and upper tier Radiolets™ can be configured to create temporary virtual computing instances to support application hosting based on application logic provided by an application provider applied to various application delivery frameworks.

Both the upper tier Radiolet(s)™ and lower tier Radiolet(s)™ may be configured to support any type of software application, and software application roll out (e.g., its introduction to the general public), may depend on business strategy and product management input from content eco-system subscribers.

The present disclosure can provide various "value added services" packaged around application programming interface (API) information (in the form of metadata) that will abet monetization. The present disclosure can provide the value added services to subscribers, but obtain them from operators as well as other third party vendors, while providing necessary information to generate these monetization API's, essentially acting as a "super market shelf" for the value added services.

The present disclosure provides for communication between any upper tier Radiolet(s)™ and multiple lower tier Radiolet(s)™ within a geographic area, which can allow the leveraging of statistical multiplexing gains, at no additional power or additional computing or additional bandwidth.

The present disclosure also provides various value added services can be provided to the subscribers through the mobile data network that, from the content eco-system subscriber perspective, allows the acceleration of roll out of new services and leveraging of market opportunities earlier than currently possible.

The present disclosure also provides means for faster Internet webpage load times, and increased subscriber traffic on Internet webpages which can result in more and potentially richer media advertisements being served on the webpages, and can benefit advertisement supported publisher sites. In addition, the present disclosure provides means for faster and potentially richer delivery of advertisements on Internet webpages and can benefit advertisement networks and advertisers. Still further, the present disclosure provides means for reduction in subscriber transaction latency and faster speeds for advertisements and recommendations, and can benefit mobile commerce websites. Faster mobile application response times which can benefit enterprise networks are also a direct result of the systems and methods described herein.

The present disclosure also enables the roll out of new rich media based services such as video based mobile commerce services, video based branchless banking and teller services, for example, without waiting for mobile operator networks to increase capacity in their networks or enterprises to increase their datacenter capacities.

In one embodiment, the present disclosure may provide the following features (without limitation), applicable to mobile data network operators: the lower tier Radiolet(s)™ can interface with any mobile broadband access network, including any 2G or 3G or 4G or future Generation network; and a 3G (or comparable) network can comprise a radio network controller (RNC) that terminates layer 2 protocols at a local switching office followed by a visited mobile gateway (e.g., a packet data service node (PDSN) or serving general packet radio service (GPRS) support node (SGSN)) at a regional switching office and finally a home gateway (e.g., high-availability HA or gateway GPRS support node (GGSN)) at a central switching office, which allows the operator to provide inter cell site mobility by anchoring at the RNC, inter local switching office mobility by anchoring at the visited gateway, and inter regional switching office mobility by anchoring at the home gateway. For example, a 4G (or comparable) network may comprise local switching offices that contain an S1 aggregation device and interface as well as to a Mobility Management Entity (MME), regional switching offices that contain a visited gateway (e.g., serving gateway S-GW), and central switching offices that contain a home gateway (packet data node gateway P-GW). In all such deployments, the lower tier Radiolet™ can be interfaced in an adaptive overlay fashion at a local switching office (for example) or any other point in the radio access network closer to the user.

In another embodiment, the present disclosure provides content and application services as well as network efficiency services for operator managed outdoor and indoor WiFi networks that are centrally connected to a common packet core.

In another embodiment, the present disclosure provides the features to simultaneously service subscriber application and content requests across multiple radio access technologies supported the same mobile data network operator from the same lower tier Radiolet™.

Traffic data packets between the core network, where the core network can comprise various servers providing various functions, for example, policy and charging rules function (e.g., PCRF) servers, real time mediation device (e.g., RTMD) and authentication, authorization, and accounting (e.g., AAA) servers, and packet data serving node (e.g., PDSN) servers, and the Radio Access Network (RAN), including network elements in the local switching office, can be tunneled using different types of IP in IP tunneling, where the type differences may be due to different standards. Similarly, packets between the lower tier Radiolet(s)™ and the RAN may also be tunneled with identical markings. This allows the existing network elements to not go through an upgrade to process packets from the servers. In an embodiment, the lower tier Radiolet(s)™ are not exposed to the RAN or network elements in the packet core by reconfiguring the appropriate Ethernet interface or layer 2 or layer 3 switch where the Radiolet(s)™ are located.

Intelligent algorithms can be provided to improve the efficiency of the RAN by increasing the number of pages/sessions that are delivered or completed in a unit of time over a given unit of spectrum. This can be achieved through a set of cross layer optimizations that can be applied to existing flow control algorithms that are typically part of TCP, and treating flow control as an outer loop control mechanism adapted to work with existing mac layer scheduling algorithms. In an embodiment, the present disclosure does not require any modifications to the mac layer scheduling algorithms.

A coordinated exchange between source and target serving nodes of content information as well as TCP parameters, referred to as "content layer mobility," can be provided for session continuity. This addresses the issue of a subscriber migrating from one content or application data serving Radiolet™ or node to another node during a content or application session.

The present disclosure can operate above the RAN which can provide for an architecture and deployment agnostic solution, which means that the present disclosure is not constrained by the type of data network deployment of mobile operators (e.g., macro, micro, pico and femto cellular deployments).

Information delivered from an operator proxy Radiolet(s)™ to lower tier Radiolets™, can be used to enforce all operator policies applicable to traffic handled typically handled by core networking elements.

The present disclosure does not require existing mobile communications network elements in an existing operator network to undergo an upgrade. Any software downtime from the existing mobile data network on the lower tier Radiolet(s)™ or upper tier Radiolet(s)™ of the present disclosure do not negatively impact the existing operator network, and normal data flows through the existing mobile communications network will continue to be supported by the present disclosure.

The lower tier Radiolet(s)™ may not be "reachable" from the Internet, except from the corresponding upper tier Radiolet(s)™. As a result, introduction of the lower tier Radiolet(s)™ into existing mobile data networks will not compromise the networks' security or the security of the networks' elements in the networks' local switching office or the location(s) where a lower tier Radiolet™ is deployed.

The upper tier Radiolet(s)™ may not be "reachable" from the public Internet, except through managed connections from an over-the-top proxy Radiolet™ or from managed secure network connections from specific over the top datacenters. As a result, introduction of the upper tier Radiolet(s)™ between the subscriber and the over the top datacenter will not compromise the datacenters' security or the security of datacenter servers or cloud datacenter.

Lawful intercept functions (e.g., obtaining mobile communications network data pursuant to lawful authority for purposes of analysis or evidence) can continue to be performed. In one embodiment of this disclosure, once a target subscriber is "identified" for a lawful intercept purpose, the subscriber's data flows may be tagged and can be served through the existing packet core network of the mobile communications network.

Once implemented, the systems and methods described herein reduce capital expenditures and operational expenditures in the mobile data network and monetization of the efficiency improvements by sharing existing mobile transport network with other mobile operators. These systems and methods also improve the utilization of mobile frequency spectrum by increasing the number of webpages/app sessions and subscriber sessions per megahertz of spectrum. In addition, the systems and methods of the present disclosure reduce RAN costs by increasing data traffic flow per cell site of a mobile data network, and add "value added services" including (without limitation) location based service enablers, reduction in transaction time for mobile commerce and other transaction services, improved performance for near real-time services (e.g., stock quotes, broking solutions), and to offer the value added services to mobile enterprise customers as well as subscribers. Implementation of the systems and methods described herein also provide means for accelerating and monetizing Wifi content and mobile broadband content using a single mobile data network that accommodates both Wifi and mobile broadband technologies.

Optionally, a system according to the present disclosure may be configured to generate data records and can feed into an existing billing support system of a mobile data network. In addition to standard records, given the metering support provided to the content eco-system, such a system can provide fine grained micro usage records that can potentially be used by operator analytics engines, for example.

Turning now to FIG. 1, an exemplary mobile communications network 100 is shown. The exemplary mobile communications network can comprise any type of mobile communications network, including (without limitation) a High Rate Packet Data (HRPD) network, a High Speed Packet Access (HSPA) network, or a Long-Term Evolution (LTE) network, for example.

The exemplary network 100 includes a base station controller and packet control function (BSC/PCF) network element or servers 101 that can be located at a local switching office (not shown). Notably, it should be understood that exemplary network element 101 can be a Radio Network Controller (RNC) of a HSPA based network or an S1 aggregator element of an LTE based network, for example. The local switching office can be in communication with one or more cell sites (not shown) where the cell sites receive data requests from one or more subscriber mobile devices (not shown). The subscriber mobile device can be any device that can be utilized in a mobile data network including, for example, cell phones, personal digital assistant (PDA) devices, laptops, smart phones, tablets, etc. In operation, the base station controller and packet control function (BSC/PCF) server 101 (or an RNC of an HSPA network) sends and/or receives data or information to a mobile data network interface 105 where the mobile interface 105 may include an AAA server 102, a policy server 103 and a prepaid server 104. The BSC/PCF server 101 represents a layer 2 termination point in a HRPD network. In a HSPA network, this element may be called a Radio Network Controlled (RNC), and in a LTE network, this element may be called an S-1 interface aggregator.

The BSC/PCF server of an HRPD network 101 (or its equivalent in HSPA or LTE network) is in communication with the mobile data network interface 105 via a L2 switch or L3 switch or policy based router (PBR) switch, or a general purpose router 111 and a managed IP network 121. The BSC/PCF server 101 is also in communication with the mobile data network interface 105 via a L2 switch or L3 switch or PBR switch or general purpose router 112 and managed IP networks 122 and 123. In an HRPD network, the BSC/PCF server 101 is in communication with a PDSN server 106 via a L2 switch or L3 switch or PBR switch or general purpose router 111, a managed IP network 122 and L2 switch or L3 switch or PBR switch or router 112. In one embodiment of this disclosure, the PDSN server 106 may communicate with an Internet datacenter 108 through a router 113 over an Internet connection 107 (or any other wired or wireless communications link). The PDSN server 106 can provide management functions (e.g., IP address allocation, content filtering, and session recovery), data functions (e.g., interface for traffic data messages, policing of traffic data messages, and deep data packet inspection) and control functions (e.g., interface for signaling data messages, routing of data, and acting as virtual local area network (VLAN)).

In one embodiment of this disclosure, during normal operation, the BSC/PCF server 101 sends data request(s) received from a subscriber mobile device to the PDSN server 106. The PDSN server 106 in turn sends the data request(s) to the Internet datacenter 108 though the Internet connection 107 (or any other wired or wireless communications link). The Internet datacenter 108, in response to the data request(s), sends requested data to the PDSN server 106 via the Internet connection 107 and through router 113. The PDSN server 106 then sends the requested data to the BSC/PCF server 101 using one or more switches/routers (e.g., L2 switch, L3 switch, or PBR switch, or router 111, 112) over one or more managed IP networks 122. Once the requested data is received at the BSC/PCF server 101, it may be sent to the subscriber mobile device (that made the initial data request) via the cell site (not shown).

Figure 2:
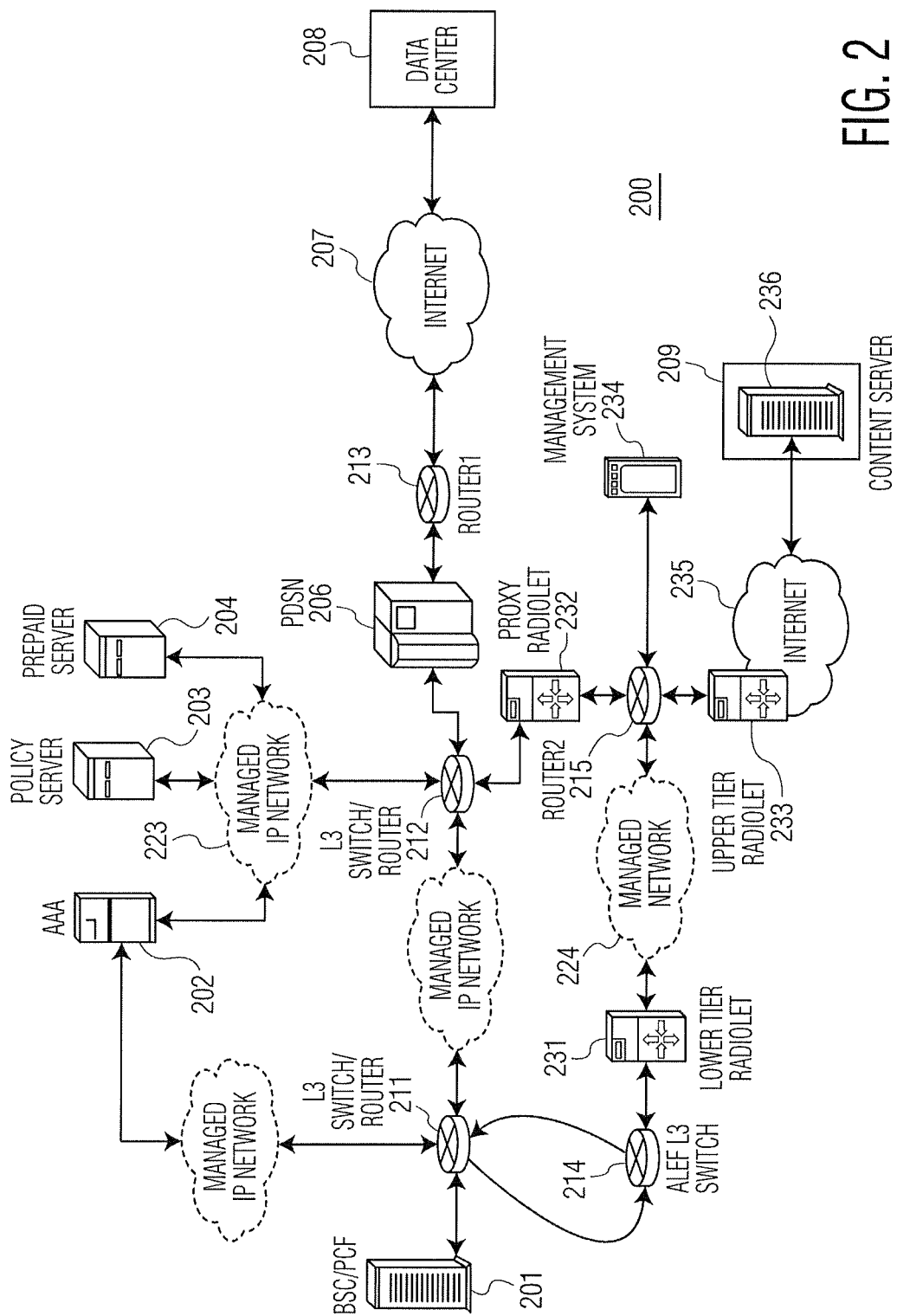
FIG. 2 illustrates an exemplary mobile communications network according to an exemplary embodiment of the present disclosure.

Turning now to FIG. 2, an exemplary mobile communications network 200 according to an exemplary embodiment of the present disclosure is shown. The exemplary mobile communications network 200 may comprise any type of mobile communications network including (without limitation) a High Rate Packet Data (HRPD) network, a High Speed Packet Access (HSPA) network, or a Long-Term Evolution (LTE) network, or operator owned WiFi access network managed through a common centralized packet core network, for example.

Included in this exemplary network 200 is an upper tier Radiolet™ 233 comprising at least one processor executing computer-readable instructions that receives data extracted from for example an Internet datacenter 209 (or a private cloud datacenter or privately owned application datacenter or any other type of datacenter) through an Internet connection 235 (or via any other wired or wireless communications link). Notably, although the exemplary network 200 depicts a single upper tier Radiolet™ 233, it should be understood that a system according to the present disclosure may include any number of upper tier Radiolets™.

The upper tier Radiolet™ 233 is located at or proximal to, for example, an Internet datacenter 209, which in this exemplary network 200 includes a content server 236, and the content server 236 is in direct communication with Internet datacenter 209 via Internet connection 235 (or any other wired or wireless communications link). The content server 236 may obtain data from the Internet datacenter 209. In one embodiment, the Internet datacenter 209 comprises datacenter 208. The Internet datacenter may optionally comprise at least one of a public and privately owned datacenter.

In another embodiment, the upper tier Radiolet™ 233 replicates at least a portion of the data extracted from the Internet datacenter 209 and transmits the replicated data to another or a plurality of upper tier Radiolet(s)™ (not shown). Notably, the upper tier Radiolet™ 233 may be located across a plurality of locations. The upper tier Radiolet™ 233 and the other upper tier Radiolet™ (not shown) may be in communication with each other via at least one of a wired and wireless communications link.

In another embodiment, one or more over the top proxy Radiolets™ (not shown), positioned between the Internet datacenter 209 and the upper tier Radiolet™ 233, may be configured to extract the data extracted from the Internet datacenter 209 and distribute the data extracted from the Internet datacenter 209 to the upper tier Radiolet™ 233. These over the top proxy Radiolet(s)™ (not shown) may each comprise at least one processor executing computer-readable instructions to perform its various functions.

The upper tier Radiolet™ 233 may further be configured to distribute at least a portion of the received data to one or more lower tier Radiolets™ 231 upon request from the lower Radiolet(s)™ or pushed directly without request based on configured policies. Although this exemplary network depicts a single lower tier Radiolet™ 231, it should be understood that a system according to the present disclosure may include any number of lower tier Radiolets™ in a given region.

As shown in this exemplary network 200, the lower tier Radiolet™ 231 may be located closer to the source of the data request (e.g., BSC/PCF sever 201) than the Internet datacenter 209. Notably, "closer to the source" may be measured in terms of network distance rather than physical distance. In an embodiment, the lower tier Radiolet™ 231 may be located at or proximal to a local switching site of a mobile data network 200. In another embodiment, the lower tier Radiolet™ 231 may be located between the BSC/PCF server 201 and the PDSN server 206 of the mobile data network 200 of an HRPD standards based mobile data network. In yet another embodiment, the lower tier Radiolet™ 231 may be located at every BSC/PCF server 201 of a mobile data network 200. In yet another embodiment, the lower tier Radiolet™ is placed between the cell site and the local switching office at a natural aggregation site.

The lower tier Radiolet™ 231 is shown in communication with the upper tier Radiolet™ 233 via at least one router/switch 215 over a managed network 224 (or any other wired or wireless communications link). The upper tier Radiolet™ 233 may be configured to select the data that is distributed to the lower tier Radiolet™ 231 based on one or more of: a frequency of requests for a particular type of data, one or more networking policies, one or more datacenter policies and one or more business policies. Alternatively (or additionally), the lower tier Radiolet™ 231 may be configured to fetch data from the upper tier Radiolet™ 233. The lower tier Radiolet™ 231 may also be configured to store portions of any received (or fetched) data, as well as perform one or more of the following functions: processing dynamic content data, including (without limitation) manipulating inputted data to produce output data, content caching and storing data. To do this, the lower tier Radiolet™ 231 may comprise at least one processor executing computer readable instructions to perform its various functions.

In operation, the lower tier Radiolet™ 231 may receive a data request from, for example, the BSC/PCF server 201 via the L2/L3/PBR switch or router 214 and the L2/L3/PBR switch or router 211. In an embodiment, the data request may be received at the lower tier Radiolet™ 231 that is located closest to the source of said data request. In another embodiment, the lower tier Radiolet™ 231 may be located at a local switching site that receives the data request prior to transmitting the data request to said lower tier Radiolet™ 231.

The lower tier Radiolet™ 231 may transmit, in response to said data request, data from the portion of received data to a source of the data request. The lower tier Radiolet™ 231 may establish a flow control protocol session between the lower tier Radiolet™ 231 and the source of the data request. The lower tier Radiolet™ 231 may then transmit the traffic data to the source of the data request as a flow control protocol datagram.

In another embodiment, one or more operator proxy Radiolets™ 232 may receive data and information extracted from at least one server, for example the AAA server 202, the policy server 203, and/or the prepaid server 204 of a core network of the mobile data network 200 via L2/L3/PBR switch/router 212 and managed IP network 223. Although this exemplary network 200 depicts a single operator proxy Radiolet™ 232, it should be understood that a system according to the present disclosure may include any number of operator proxy Radiolets™.

The operator proxy Radiolet™ 232 may transmit at least a portion of the extracted information to the lower tier Radiolet™ 231, via a router 215 over a managed network 224 (or any other wired or wireless communications link). The extracted information may comprise information from an authentication, authorization and accounting (e.g., AAA) server, information from a policy and charging rules function (e.g., PCRF) server, information from a real time mediation device (e.g., RTMD) server and/or information and data from any other type of server or source. In this way, the operator proxy Radiolet™ 232 can support and implement various fee-charging and policing interfaces (or any other policy, security, management, business, etc. interfaces) as part of the mobile communications network 200.

In an embodiment, the AAA server 202 may communicate with the PDSN server 206 using a networking protocol, such as Remote Authentication Dial In User Service (RADIUS), for example, to provide subscriber authentication information to the PDSN server 206 during a subscriber session. The RADIUS protocol can be a networking protocol that provides authentication, authorization and accounting management for subscribers. The operator proxy Radiolet™ 232 may request and receive a portion of the information from the AAA server 202 via a router or switch 212 and a managed IP network 223. The operator proxy Radiolet™ 232 provides the information (e.g., subscriber information and session accounting information) from the AAA server 202 to the lower tier Radiolet™ 231 via router 215 and managed network 224.

In another embodiment, the policy server 203 may optionally be a PCRF server. In operation, the operator proxy Radiolet™ 232 communicates and interfaces with the PCRF server using Gx protocols, for example, where Gx is an online policy interface between the PDSN and the PCRF, via router or switch 212 and a managed IP network 223. The operator proxy Radiolet™ 232 provides information from the PCRF server to the lower tier Radiolet™ 231, via router 215 and managed network 224, that may be used to control policy functions (e.g., credit control request update and credit control request termination).

The prepaid server 204 may optionally comprise a RTMD server. The operator proxy Radiolet™ 232 optionally communicates and interfaces with the RTMD server using Diameter Gy protocols (e.g., Diameter Credit-Control (DCCA) protocol), for example, where Gy is an online charging interface between the PDSN 206 and the RTMD servers, via router or switch 212 and a managed IP network 223. The operator proxy Radiolet™ 232 provides information from the RTMD to the lower tier Radiolet™ 231, via for example router 215 and managed network 224, that may be used to tag subscriber sessions as "prepaid" based on profile information of the subscriber session.

In an embodiment, postpaid charging functions involve a RADIUS server (not shown) in communication with the lower tier Radiolet™ 231 via an operator proxy Radiolet™ 232. In such an embodiment, the PDSN server 206 collects radio specific parameters (e.g., Airlink Records) from a Radio Access Network (RAN) and combines the radio specific parameters with IP network specific parameters to form one or more Usage Data Records (UDR). The PDSN server 206 can use RADIUS protocols to send the UDR information to the RADIUS server. Each UDR data packet may be associated with a correlation ID, which identifies accounting records generated for a particular subscriber session and is provided to the RADIUS server by the PDSN server 206 at the time authentication and authorization of accounting information is performed.

Similarly, in one embodiment, the operator proxy Radiolet™ 232 may collect radio specific parameters from the RAN and combine the radio specific parameters with IP network specific parameters to form UDR, and use RADIUS protocols to send the UDR information to the RADIUS server (not shown). Optionally, the operator proxy Radiolet™ 232 may maintain the UDR information until it receives confirmation that the RADIUS server has properly received the information. If no confirmation is received from the RADIUS server within a period of time, the operator proxy Radiolet™ 232 may retransmit the UDR information to the RADIUS server. The operator proxy Radiolet™ 232 may transmit the UDR information to other RADIUS servers.

In one embodiment, various events that trigger the PDSN server 206 to take accounting action and send the UDR information may include (without limitation) traffic data (e.g., A10 messages) connection termination at the PDSN server 206, data service establishment, PPP renegotiations on the PDSN server 206, arrival of subscriber data, and timer expiration. Various events that cause the PDSN server 206 to stop sending UDR information may include (without limitation), an existing A10 connection is closed, an IP flow is removed from the corresponding A10, and the PDSN server 206 determines the packet data session associated with the Correlation ID has ended.

The operator proxy Radiolet™ 232 may not require an event to trigger accounting action, but may require an event to trigger UDR termination including (without limitation) subscriber session termination or IP flow termination.

In another embodiment, the lower tier Radiolet™ 231 may receive data or information from a management system server 234 via at least one router/switch 215 over a managed network 224 (or any other wired or wireless communications link). One or more management system servers 234 may monitor the upper tier Radiolet™ 233 and lower tier Radiolet™ 231 (e.g., monitoring the number of active IP tunneled sessions, the bandwidth usage of the subscriber sessions, the nature of the data requests, and the frequency of network usage).

Figure 3:
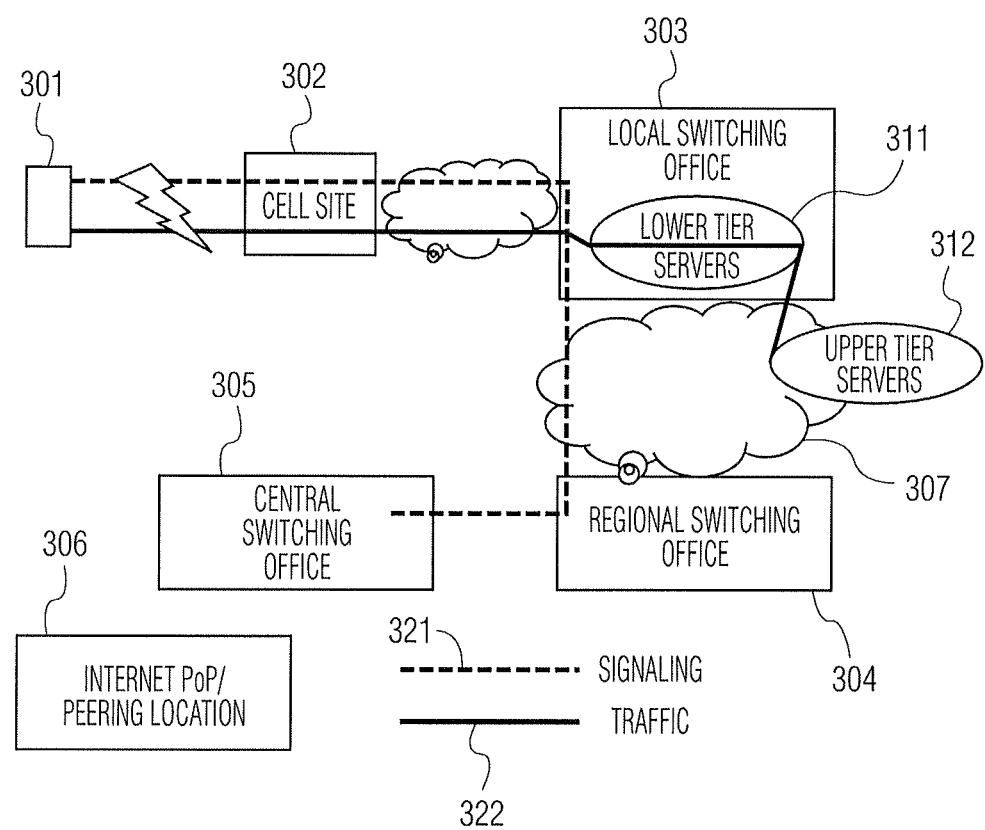
FIG. 3 illustrates an exemplary network signaling data flow pathway and an exemplary traffic data flow pathway according to an exemplary embodiment of the present disclosure.

Turning now to FIG. 3, an exemplary network signaling data flow pathway 321 and a traffic data flow pathway 322 according to an exemplary embodiment of the present disclosure is shown.

The exemplary network signaling data flow pathway 321 comprises the carrying of network signaling data, for example A11 messages in an HRPD standards based mobile data network, from a subscriber mobile device 301 to a central switching office 305, where the data is received at a cell site 302, then sent to a local switching office 303, then to a regional switching office 304, and then to a central switching office 305 before being routed to an Internet datacenter (e.g., 208 in FIG. 2) via the Internet point of presence (PoP)/Peering location 306 or the Internet connection 307 (or any other wired or wireless communications link). The regional switching office 304 and central switching office 305 may not be local to the area where the mobile device 301 is located, and the network signaling data served can traverse several hundreds of miles before reaching the mobile device 301.

The traffic data flow pathway 322, according to an exemplary embodiment of the present disclosure, involves the lower tier Radiolet™ 311 receiving a data request at a local switching site 303, for example at a BSC/PCF (e.g., 201 in FIG. 2), from at least one subscriber mobile device 301. The data request is sent from the mobile device 301 to a cell site 302 and then is sent from the cell site 302 to the local switching site 303. The data request is routed from the local switching site 303 to the lower tier Radiolet™ 311.

The routing of the data request, according to an exemplary embodiment of the present disclosure, from the local switching site 303 to the lower tier Radiolet™ 311 comprises: a router(s) and a switch(es) (not shown) that identifies traffic data 322 and network signaling data 321; the router or switch separates the traffic data 322, for example A10 messages, from the network signaling data 321, for example A11 messages; the router or switch provides the network signaling data 321 to a core network of a mobile data network; and the router or switch provides the traffic data 322 to the at least one lower tier Radiolet™ 311. The traffic data 322 is then sent between the lower tier Radiolet™ 311, the upper tier Radiolet™ 312, and the Internet datacenter (e.g., 209 in FIG. 2), bypassing the regional switching office 304 and the central switching office 306.

In an embodiment, the BSC/PCF server (e.g., 201 in FIG. 2) may be associated with a PDSN server (e.g., 206 in FIG. 2) of a mobile data network (e.g. 200 in FIG. 2). The IP addresses of the BSC/PCF server (e.g., 201 in FIG. 2) and the associated PDSN server (e.g., 206 in FIG. 2) may be determined by a router or switch (e.g., L3 router/switch 214 in FIG. 2) in order to separate the traffic data 322 from the network signaling data 321. The traffic data 322 between the BSC/PCF server (e.g., 201 in FIG. 2) and the PDSN server (e.g., 206 in FIG. 2) may be identified by a Generic Routing Encapsulation (GRE) protocol, for example, using an IP protocol (e.g., IP-protocol type 47). Also, any data packets that are not network signaling data 321 (e.g., not A11 messages) may be identified as traffic data 322. The traffic data 322 is routed by the router or switch (e.g., L3 router/switch 211 and 214 in FIG. 2) from the BSC/PCF server (e.g., 201 in FIG. 2) to the lower tier Radiolet™ 311. Traffic data 322 may also be routed via the router or switch (e.g., L3 router/switch 211 and 212) and managed IP network (e.g., 224 in FIG. 2) to the PDSN server (e.g., 206 in FIG. 2). In an embodiment, the lower tier Radiolet™ 311 may be configured to intercept domain name system (DNS) query packets from the BSC/PCF server (e.g., 201 in FIG. 2) and respond to the query to obtain the traffic data 322. In order for the traffic data 322 to maintain its properties, the lower tier Radiolet™ 311 may utilize an appropriate GRE key and BSC/PCF and PDSN IP addresses. The GRE key is used to create a traffic data tunneling connection between the lower tier Radiolet™ 311 and BSC/PCF server (e.g., 201 in FIG. 2) and the traffic data 322 is routed from the lower tier Radiolet™ 311 to the BSC/PCF server (e.g., 201 in FIG. 2) and ultimately to the subscriber mobile device 301. In an embodiment, a single traffic data connection is implemented per subscriber where multiple IP flows are implemented into the one traffic data connection. The traffic data 322 may be packed into a Point-to-Point Protocol (PPP) stream. Since the PPP stream may require an in-sequence delivery of traffic packets, the lower tier Radiolet™ 311 may sync its traffic data sequencing with the traffic data sequencing from the BSC/PCF server (e.g., 201 in FIG. 2) and PDSN server (e.g., 206 in FIG. 2).

The network signaling data 321 is then routed by a router or switch (e.g., L3 router/switch 211 and 212) between the BSC/PCF (e.g., 201 in FIG. 2) and the associated PDSN (e.g., 206 in FIG. 2), without modification. In one embodiment, the network signaling data 321 may be examined, for example, to identify relevant data or information contained in the network signaling data 321. The network signaling data 321 may be routed via a router or switch (e.g., L3 router/switch 211 and 214) to the lower tier Radiolet™ 311 for examination by the lower tier Radiolet™ 311, and then routed to the BSC/PCF server (e.g., 201 in FIG. 2) or PDSN (e.g., 206 in FIG. 2) server. The lower tier Radiolet™ 311 may obtain the GRE key and traffic data sequencing for the traffic data 322 connection through examination of the network signaling data 321.

In another exemplary embodiment according to the present disclosure, a method for data packet flow may provide for subscriber access to a fictitious Internet site (e.g., www.xyz.com). According to this example, a subscriber may power up a mobile device which in turn discovers a mobile communications network using methods known, or later known, in the art, including (without limitation) probes, pilots, and control data that is transmitted by the mobile device. The control data may be sent by the mobile device as long as the Internet site is still being downloaded, or if the mobile device is in the middle of an active session. The mobile device may receive discovery messages from the mobile communications network and register at the link layer using methods known, or later known, in the art. The mobile device may then register with a core network of the mobile communications network which enables the mobile device to authenticate with the network, obtain network addresses (both visited IP and home IP addresses), and establish a mobile session.

Next, the mobile device may send a domain name system (DNS) request for www.xyz.com. This request packet may be identified by software of a lower tier Radiolet™ and directed to an appropriate hosting Radiolet™ (or virtual Radiolet™) at the lower tier Radiolet™ that is close (geographically) to the subscriber. The appropriate lower tier Radiolet™ (or virtual Radiolet™) may resolve the domain name and translate it to a local IP address on a lower tier Radiolet™ (or virtual Radiolet™) hosted at (or near) the same location. This resolved packet may then be sent back to the subscriber mobile device. The mobile device may then send a request for a specific piece of content on the website using an Hypertext Transfer Protocol (HTTP) get request packet, with the source IP address as itself and the destination IP address equal to the resolved IP address of the host server (obtained by sending the resolved packet back to the subscriber mobile device). The lower tier Radiolet™ (or virtual Radiolet™) may then establish a TCP session and start to deliver content to the mobile device, where the flow control algorithm and parameters may be modified and adapted based on previous history of bandwidth estimates between the server and mobile device. Such history information may be shared across servers (and virtual servers) that are housed in the same location. After all requested data packets are delivered, the HTTP session may be terminated.

In one embodiment of this disclosure, the content delivered to the mobile device is readily available at the hosting location (e.g., at the lower tier Radiolet™). If the content is not readily available at the lower tier Radiolet™, then the upper tier Radiolet™ may fetch content through a back-to-back (B2B) User Agent from the internet datacenter. The B2B User Agent may serve as a client to the internet datacenter and as a server to the mobile device.

The details of the number of data bytes and related information may then be reported by the lower tier Radiolet™ to both operator network billing systems and cloud datacenter metering systems.

In the above exemplary embodiment, the appropriate hosting lower tier Radiolet™ may be located very close to the subscriber, and before the start of the Mobile Middle Mile™. This allows for the round trip time (RTT) to be reduced thereby leading to reduction in mobile latency. By reducing the mobile latency, the amount of control data sent by the mobile device during the download is also reduced. Also, once the delivery of the webpage is complete, more webpages for the same subscriber mobile device or new webpages for a different subscriber mobile device can begin to be delivered, which can allow for improvement in radio efficiency.

Additionally, in the above exemplary embodiment, the appropriate network awareness to the application and application awareness to the network may be created using at least one network API and/or at least application API, thereby improving subscriber QoE.

Furthermore, optimizations may be added to flow control, providing for further reduction in mobile latency along with simultaneous improvements in radio efficiency. Also, given that traffic data does not traverse the Mobile Middle Mile™, the amount of traffic data handled by the core network of a mobile communications network is reduced, which can lead to corresponding improvements in efficiencies. Finally, neither the operator network nor the cloud datacenter need to be upgraded.

In yet another exemplary embodiment, a method of reducing a round trip time (RTT) for traffic packets is provided. The method provides content to a content requestor, where the content can be one or more of static content, dynamic content, a real-time or delayed media feed, application data, or any other type of content, and can be in the form of traffic data packets. The method provides for a reduction of an end-to-end latency of a session, where the session can one or more of a webpage, a data stream and an application.

The method includes identifying, by a processor executing computer-readable instructions, a location of a data requestor where the requestor requests traffic data packets. The requestor can be a subscriber or subscriber mobile device of a mobile data network. Then, identifying, by a processor executing computer readable instructions, a content distribution entity configured to provide the requested traffic packets. The content distribution entity can be a Radiolet™ and can be located proximate to a location of the data requestor. Notably, "proximate" may optionally refer to a measure of network distance rather than physical distance. A processor executing computer readable instructions can then transmit the requested traffic packets to the requestor from the proximate content distribution entity.

The method may also include pushing content and application data from one or more content providers to the content distribution entity in real time and storing the content at the content distribution entity for current and/or future requests. The distribution entity may optionally transmit up-to-date traffic packets in response to traffic packet requests.

Transmitting the requested content and application data packets from the proximate content or application data distribution entity can reduce a session time and can simultaneously reduce the load on a wireless communication link by reducing reverse link traffic attributed to control layer messages. The method can further include servicing additional traffic packets via the same shared wireless communication link.

In yet another exemplary embodiment, a method may improve mobile data network efficiency and can improve the efficiency of an internet datacenter by reducing the number of content and/or application sessions hosted in the datacenter.

The method includes separating, by a processor executing computer-readable instructions, signaling and management function data from traffic function data. The management function data may be provided by a management entity and the traffic function data may be provided by a traffic entity. The method may further include receiving, by a Radiolet™, one or more requests for traffic data; and identifying and separating, by a processor executing computer readable instructions, traffic data packets from signaling data packets included in the requests for traffic data.

The method may also include identifying, by a processor executing computer-readable instructions, a location of a source of the requests for traffic data and a traffic entity closest to the source, and servicing the traffic packets from a proximate traffic entity or the closest traffic entity. Servicing traffic packets from the proximate traffic entity or the closest traffic entity may reduce a session time and reduce the load on a wireless communication link or datacenter by reducing reverse link traffic attributed to control layer messages. Notably, "proximate" may refer to a measure of network distance rather than physical distance. The method may also include servicing additional traffic packets via the same shared wireless communication link.

The method may further include servicing the signaling data packets via the existing packet core network entity and applying various methods related to flow control and resource management in the traffic plane. Appropriate parameters may be chosen as input to the flow control and resource management methods.

In still another exemplary embodiment, a method may provide for mobile latency reduction and more generally improvement in application performance. The method includes transmitting data content from Internet sites or enterprises to upper tier Radiolets™ located at upper tier Radiolet™ locations and replicating, transmitting and storing the data content at additional upper tier Radiolets™ located at additional upper tier Radiolet™ locations. Determining which additional upper tier Radiolet™ locations receive the replicated data content may be based on a combination of predetermined static and dynamic rules. The method may also include replicating and transmitting the data content directly to lower tier Radiolets™ from the upper tier Radiolets™.

The method includes delivering content or application data, in response to requests for traffic data from a requestor, to the lower tier Radiolet™ closest to the requestor. The delivering content or application data step may include identifying, by a processor executing computer-readable instructions, a location of the requestor, identifying and separating traffic packets from signaling packets included in the requests for traffic data, transmitting all signaling traffic packets to a network entity and transmitting all traffic packets to the lower tier Radiolet™ closest to the requestor. The lower tier Radiolet™ may then transmit requested traffic data to the requestor.

In yet another exemplary embodiment, a method includes receiving, by a Radiolet™, one or more requests for traffic data and separating, by a processor executing computer-readable instructions, signaling and management functions from traffic functions such that the signaling and management functions are provided by a management entity and the traffic functions are provided by a traffic entity. The traffic entity may comprise a content distribution entity.

The method includes identifying and separating, by a processor executing computer-readable instructions, traffic packets from signaling packets included in the one or more requests for traffic data and identifying a content distribution entity configured to provide the requested traffic data. The content distribution entity may be located proximate to the determined location of the requestor.

The method may further include servicing the signaling packets via the existing packet core network entity, transmitting the requested traffic data to the requestor from the proximate content distribution entity, and applying various methods related to flow control and resource management.

In a further exemplary embodiment, any of the features and/or method steps described herein may be embodied in and/or implemented by any of the systems, devices, processors or apparatus described herein. Moreover, any of the method steps described herein may be implemented in an operator network and/or an Internet cloud datacenter using existing equipment and apparatus by implementing one or more software applications having computer readable instructions that when executed cause said existing equipment and apparatus to perform (or exhibit) one or more of the method steps and/or features described in this disclosure.

A system according to the present disclosure may comprise one or more computer devices comprising one or more processors configured to execute computer readable instructions that, when executed, cause said one or more computer devices to perform any of the method steps (and/or exhibit any of the features) described herein. The computing devices may include any combination of (and any number of) Radiolets™, datacenters, computers, data sources, data request sources, servers, mobile communication devices, smart phones, tablets, any other mobile telecommunication and/or mobile data network elements, and/or any other computing and/or communication devices.

Notably, the systems and methods described herein are not limited to typical mobile communications. Instead, the systems and methods described herein may be in connection with mobile entertainment enablement solutions, mobile infotainment enablement solutions, mobile ad-tech enablement solutions, mobile social media enablement solutions, mobile commerce enablement solutions, mobile enterprise application enablement solutions, mobile peer-to-peer enablement solutions, mobile communications enablement solutions mobile enterprise application enablement solutions, and other mobile solutions such as toll-free data enablement solutions.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system of delivering data, the system comprising:
at least one upper tier radiolet comprising at least one processor executing computer-readable instructions that cause the at least one upper tier radiolet to:
receive data extracted from an Internet datacenter, and
distribute at least a portion of the received data to at least one lower tier radiolet; and
the at least one lower tier radiolet in communication with the at least one upper tier radiolet via at least one of a wired and wireless communications link, the at least one lower tier radiolet comprising at least one processor executing computer-readable instructions that cause the at least one lower tier radiolet to:
store said portion of the received data,
receive a data request, and
transmit, in response to said data request, data from the portion of received data to a source of the data request,
wherein the at least one lower tier radiolet is located closer to the source of the data request than the Internet datacenter,
wherein the at least one upper tier radiolet performs application service functions, the application service functions comprising one or more of application hosting, application management, application data processing, and application data delivery, and
wherein the at least one lower tier radiolet performs network plane functions, the network plane functions comprising one or more of performing traffic data functions, encapsulating and tunneling traffic data packets, traffic data packet management, network policy enforcement, and monitoring signaling data messages.

2. The system of claim 1, wherein the at least one upper tier radiolet executes computer-readable instructions that cause the at least one upper tier radiolet to:
replicate at least a portion of the data extracted from the Internet datacenter, and transmit said replicated data to at least one other upper tier radiolet.

3. The system of claim 2, wherein the upper tier radiolets are located across a plurality of locations.

4. The system of claim 2, wherein the at least one upper tier radiolet and the at least one other upper tier radiolet are in communication with each other via at least one of a wired and wireless communications link.

5. The system of claim 1, wherein the at least one upper tier radiolet is located at or proximal to the Internet datacenter and is in direct communication with said Internet datacenter via at least one of a wired and wireless communications link, said Internet datacenter comprising at least one of a public and privately owned datacenter.

6. The system of claim 1, further comprising:
at least one over the top proxy radiolet in communication with the at least one upper tier radiolet via at least one of a wired and wireless network and positioned between the Internet datacenter and the at least one upper tier radiolet, the at least one over the top proxy radiolet comprising at least one processor executing computer-readable instructions that cause the at least one over the top proxy radiolet to:
extract the data extracted from the Internet datacenter, and
distribute the data extracted from the Internet datacenter to the at least one upper tier radiolet.

7. The system of claim 1, wherein the at least one lower tier radiolet executes computer-readable instructions that cause the at least one lower tier radiolet to fetch at least a portion of the received data from the at least one upper tier radiolet.

8. The system of claim 1, wherein the at least one lower tier radiolet is in communication with the at least one upper tier radiolet via at least one of a router and a switch.

9. The system of claim 1, wherein the at least one upper tier radiolet executes computer-readable instructions that cause the at least one upper tier radiolet to select the data distributed to the at least one lower tier radiolet based on one or more of: a frequency of requests for a particular type of data, one or more networking policies, one or more datacenter policies and one or more business policies.

10. The system of claim 1, wherein the at least one lower tier radiolet executes computer-readable instructions that cause the at least one lower tier radiolet to perform one or more of the following functions: processing dynamic content data, content caching and storing data.

11. The system of claim 1, wherein the at least one lower tier radiolet is located at or proximal to a local switching site of a mobile data network.

12. The system of claim 11, wherein the mobile data network comprises a High Rate Packet Data (HRPD) network and wherein the at least one lower tier radiolet is located between a Packet Control Function (PCF) server and a Packet Data Service Node (PDSN) of the mobile data network.

13. The system of claim 11, wherein the mobile data network comprises a High Speed Packet Access (HSPA) network and wherein the at least one lower tier radiolet is located between a Radio Network Controller (RNC) server and a Gateway GPRS Support Node (GGSN) of the mobile data network.

14. The system of claim 11, wherein the mobile data network comprises a Long-Term Evolution (LTE) network and wherein the at least one lower tier radiolet is located between a S1 Concentrator and a Packet Data Gateway (PGW) of the mobile data network.

15. The system of claim 11, further comprising:
at least one operator proxy radiolet in communication with the at least one lower tier radiolet via at least one of a wired and wireless network, the at least one operator proxy radiolet comprising at least one processor executing computer-readable instructions that cause the at least one operator proxy radiolet to:
receive information extracted from at least one server of a core network of the mobile data network, and
transmit at least a portion of the extracted information to the at least one lower tier radiolet prior to transmitting data to the source of the data request.

16. The system of claim 15, wherein the extracted information comprises at least one of: information from an authentication, authorization, and accounting server, information from a policy and charging rules function server, and information from a real time mediation device server.

17. The system of claim 1, further comprising:
a local switching site, in communication with the at least one lower tier radiolet via at least one of a wired and wireless network, executing computer-readable instructions that cause the local switching site to:
receive the data request from at least one subscriber mobile device, and
route the data request from the local switching site to the at least one lower tier radiolet.

18. The system of claim 17, further comprising:
at least one of a router and a switch, in communication with the local switching site and the at least one lower tier radiolet via at least one of a wired and wireless communications link, executing computer-readable instructions to:
- identify traffic data and signaling data,
- separate the traffic data from the signaling data,
- provide the signaling data to a core network of a mobile data network, and
- provide the traffic data to the at least one lower tier radiolet.

19. The system of claim 18, wherein the at least one lower tier radiolet executes computer-readable instructions that cause the at least one lower tier radiolet to:
- establish a flow control protocol session between the at least one lower tier radiolet and the source of the data request, and
- transmit said traffic data to the source of the data request as a flow control protocol datagram.

20. The system of claim 17, wherein the lower tier radiolet is located at the local switching site that receives the data request prior to transmitting the data request to said lower tier radiolet.

21. The system of claim 1, wherein the data request is received at the lower tier radiolet that is located closest to the source of said data request.

22. A method of delivering data, the method comprising:
- receiving, by at least one upper tier radiolet comprising at least one processor executing computer-readable instructions, data extracted from an Internet datacenter;
- distributing, by the at least one upper tier radiolet, at least a portion of the received data to at least one lower tier radiolet, said at least one lower tier radiolet comprising at least one processor executing computer readable instructions;
- storing, by the at least one lower tier radiolet, said portion of the received data;
- receiving, by the at least one lower tier radiolet, a data request; and
- transmitting, by the at least one lower tier radiolet and in response to said data request, data from the portion of received data to a source of the data request, wherein the at least one lower tier radiolet is located closer to the source of the data request than the Internet datacenter, wherein the at least one upper tier radiolet performs application service functions, the application service functions comprising one or more of application hosting, application management, application data processing, and application data delivery, and wherein the at least one lower tier radiolet performs network plane functions, the network plane functions comprising one or more of performing traffic data functions, encapsulating and tunneling traffic data packets, traffic data packet management, network policy enforcement, and monitoring signaling data messages.

23. The method of claim 22, further comprising:
- replicating, by the at least one upper tier radiolet, at least a portion of the data extracted from the Internet datacenter; and
- transmitting, by said at least one upper tier radiolet, said replicated data to at least one other upper tier radiolet.

24. The method of claim 23, wherein the upper tier radiolets are located across a plurality of locations.

25. The method of claim 23, wherein the at least one upper tier radiolet and the at least one other upper tier radiolet are in communication with each other via at least one of a wired and wireless communications link.

26. The method of claim 22, wherein the at least one upper tier radiolet is located at or proximal to the Internet datacenter and is in direct communication with said Internet datacenter via at least one of a wired and wireless communications link, said Internet datacenter comprising at least one of a public and privately owned datacenter.

27. The method of claim 22, further comprising:
- extracting, by at least one over the top proxy radiolet positioned between the Internet datacenter and the at least one upper tier radiolet, the data extracted from the Internet datacenter, said at least one over the top proxy radiolet comprising at least one processor executing computer-readable instructions; and
- distributing, by said at least one over the top proxy radiolet, the data extracted from the Internet datacenter to the at least one upper tier radiolet.

28. The method of claim 22, further comprising:
- fetching, by the at least one lower tier radiolet, at least a portion of the received data from the at least one upper tier radiolet.

29. The method of claim 22, wherein the at least one lower tier radiolet is in communication with the at least one upper tier radiolet via at least one of a router and a switch.

30. The method of claim 22, wherein the data distributed to the at least one lower tier radiolet is selected, by the at least one upper tier radiolet, based on one or more of: a frequency of requests for a particular type of data, one or more networking policies, one or more datacenter policies and one or more business policies.

* * * * *